J. F. WEBER.
FLOOR SCRAPER OR PLANER.
APPLICATION FILED JULY 11, 1907.

913,862.

Patented Mar. 2, 1909.
3 SHEETS—SHEET 1.

WITNESSES.

INVENTOR.
John F. Weber
By Benedict, Morsell & Caldwell
ATTORNEYS.

J. F. WEBER.
FLOOR SCRAPER OR PLANER.
APPLICATION FILED JULY 11, 1907.

913,862.

Patented Mar. 2, 1909.
3 SHEETS—SHEET 2.

WITNESSES.

INVENTOR.
John F. Weber,
By Benedict, Morsell & Caldwell
ATTORNEYS.

THE NORRIS PETERS CO., WASHINGTON, D. C.

J. F. WEBER.
FLOOR SCRAPER OR PLANER.
APPLICATION FILED JULY 11, 1907.

913,862.

Patented Mar. 2, 1909.
3 SHEETS—SHEET 3.

WITNESSES.

INVENTOR.
John F. Weber,
By Benedict, Morsell & Caldwell
ATTORNEYS.

UNITED STATES PATENT OFFICE.

JOHN F. WEBER, OF WEST ALLIS, WISCONSIN.

FLOOR SCRAPER OR PLANER.

No. 913,862.      Specification of Letters Patent.      Patented March 2, 1909.

Application filed July 11, 1907. Serial No. 383,263.

*To all whom it may concern:*

Be it known that I, JOHN F. WEBER, residing at West Allis, in the county of Milwaukee and State of Wisconsin, have invented new and useful Improvements in Floor Scrapers or Planers, of which the following is a description, reference being had to the accompanying drawings, which are a part of this specification.

This invention has for its object to provide a floor scraper or planer of a construction which is adapted to produce its cutting action during each stroke of its movement back and forth over the surface treated.

Another object of this invention is to provide a floor scraper with a blade adapted to adjust itself to the surface of the floor so as to produce an even scraping action.

Another object of this invention is to provide means for adjusting the angle of incline of the scraping blades.

Another object of this invention is to provide a tiltable weighted frame having yielding joints to permit the scraping blades carried thereby to properly adjust themselves to the floor and a swinging handle having a hand operated engaging means for permitting it to be releasably engaged with either side of the frame, said handle constituting a means for tilting the frame and for moving the scraper across the surface to be treated.

With the above and other objects in view the invention consists in the floor scraper herein claimed, its parts and combinations of parts, and all equivalents.

Figure 1:
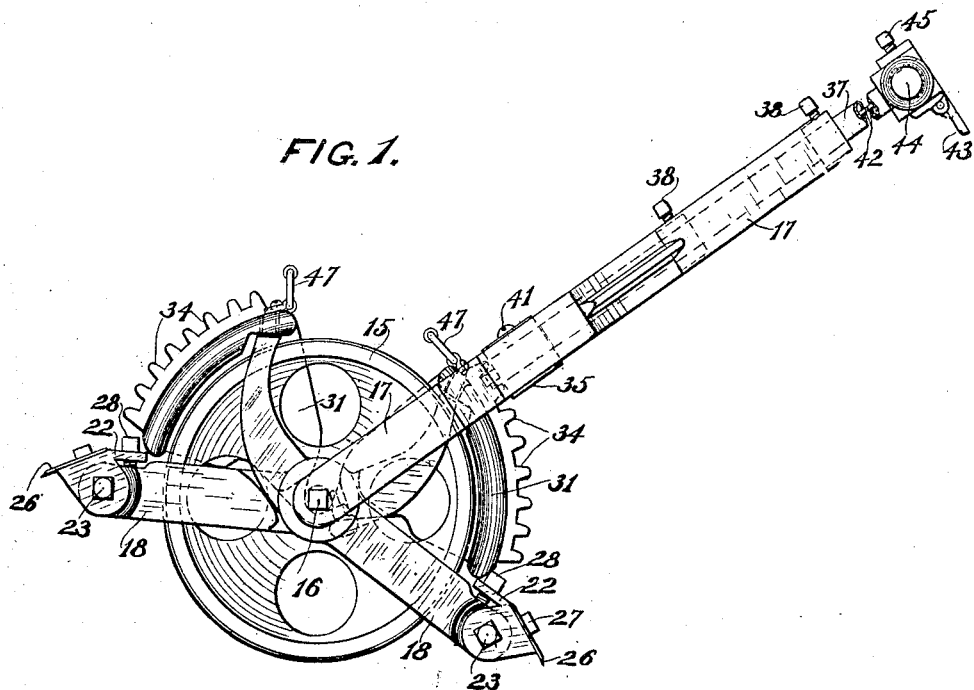
Figure 2:
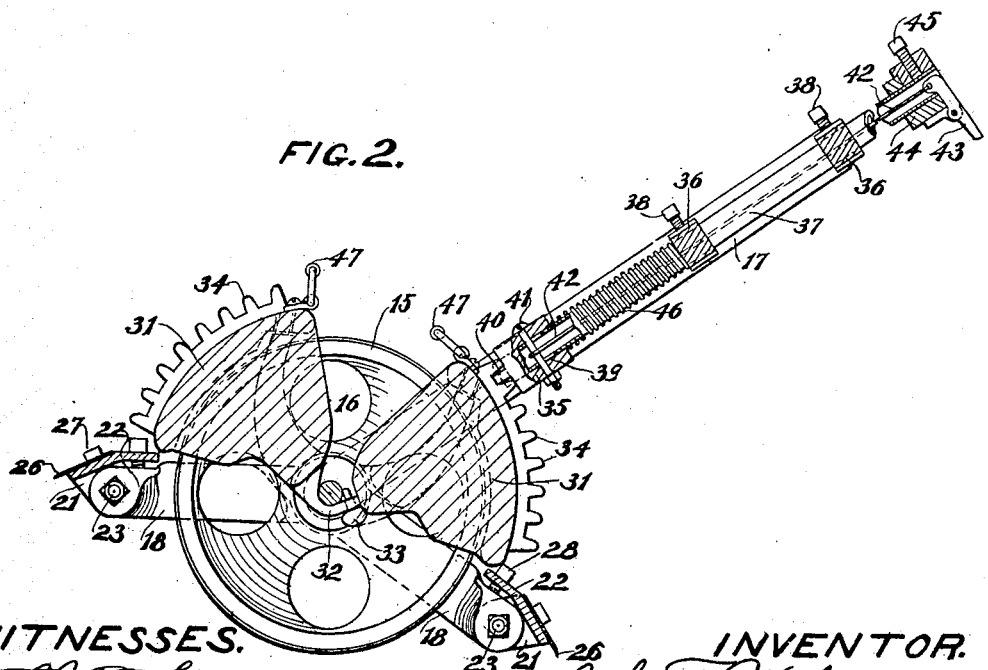
Figure 3:
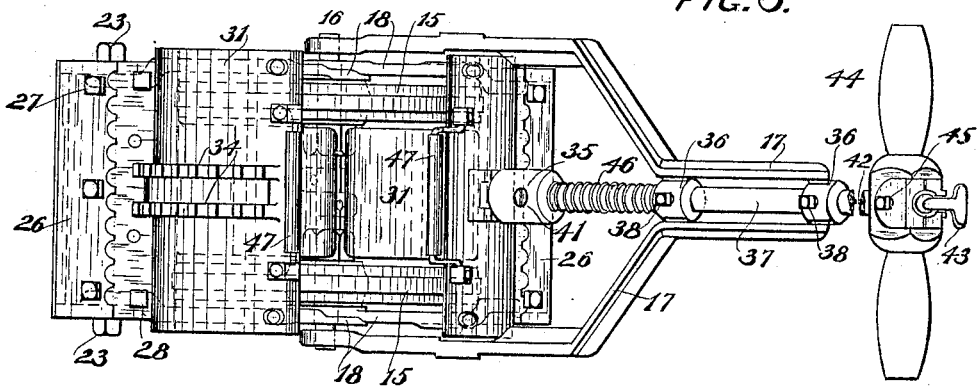
Figure 4:
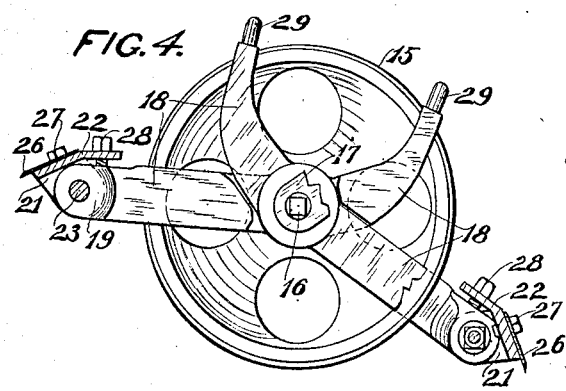
Figure 5:
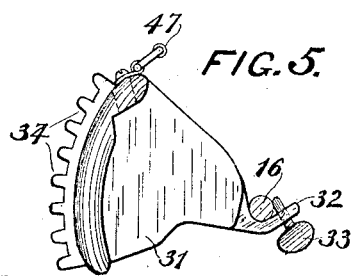
Figure 7:
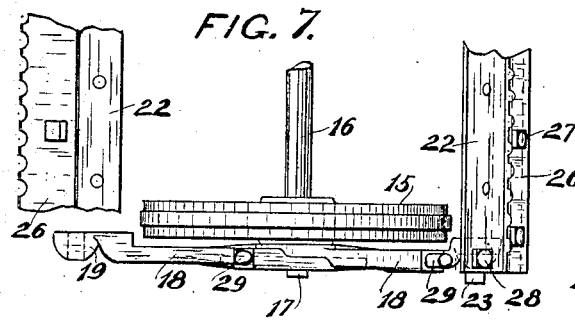
Figure 6:
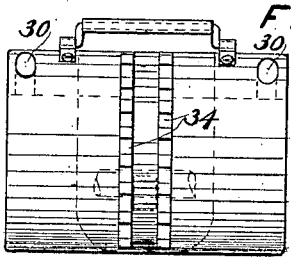
Figure 8:
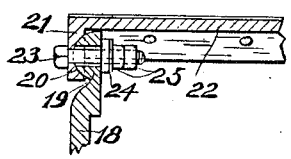
Figure 9:
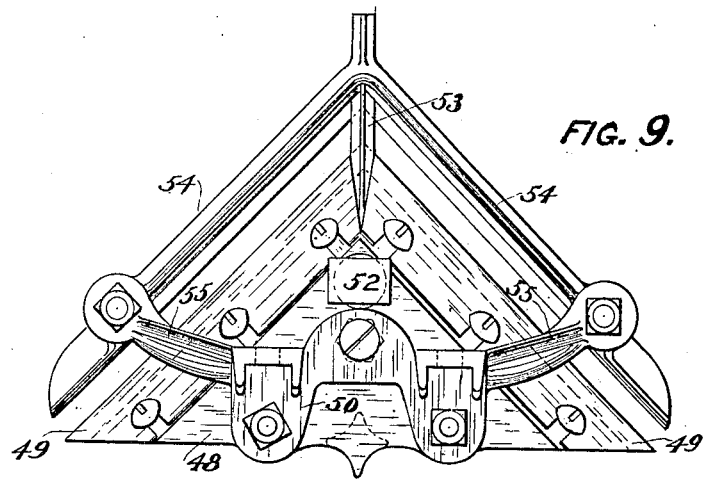
Figure 10:
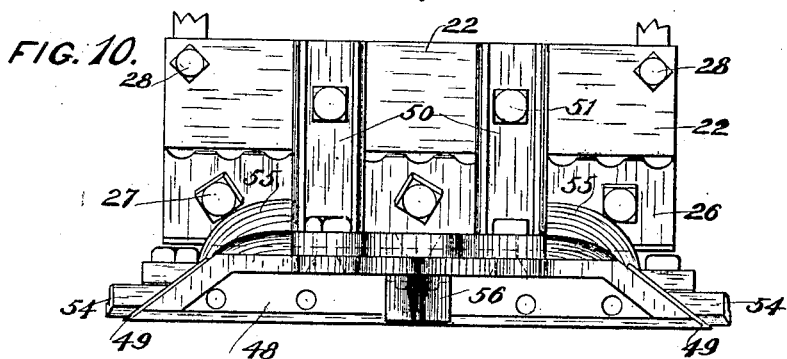
Figure 11:
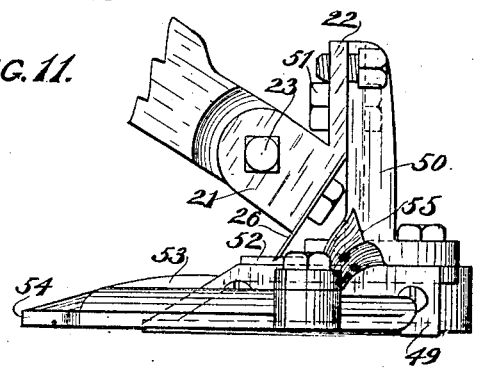

Referring to the accompanying drawings in which like characters of reference indicate the same parts in the several views; Figure 1 is a side elevation of a floor scraper constructed in accordance with this invention; Fig. 2 is a sectional elevation thereof; Fig. 3 is a plan view thereof; Fig. 4 is a side view partly in section of the device with the weights and handle removed; Fig. 5 is a side view of one of the weights; Fig. 6 is a plan view thereof; Fig. 7 is a plan view of a portion of the frame showing one of the scraper blades reversed; Fig. 8 is a detail view of one of the ball and socket joints of the cutter frame; Fig. 9 is a plan view of the plane attachment of this invention; Fig. 10 is a rear elevation thereof; and, Fig. 11 is a side elevation thereof attached to the cutter frame.

In these drawings 15 represents a pair of wheels, which are preferably rubber tired and which are loosely mounted on an axle 16 carried by the yoke arms of a forked handle member 17. A pair of crossed rods 18 are formed and fitted together like the members of a pair of shears and are loosely mounted on the axle 16 at each end thereof between the wheels 15 and the ends of the handle 17. Each member 18 has a half ball shaped lower end 19 which fits within a concave recess or socket 20 in the end ear 21 of a pair of plates 22 forming blade holders. A bolt 23 passes through the end ears 21 of the blade holders and through somewhat larger openings in the ball shaped ends of the crossed arms 18 with rubber washers 24 mounted thereon between said crossed arms and pairs of jam nuts 25 threaded on the bolt. By this means each of the scraper blades is yieldingly connected at its ends to the pivotally mounted cross arms so as to permit it to move out of parallelism with the axle when desired. Each of the plates 22 is slightly angular in cross section as shown in Fig. 4 and has a knife or scraping blade 26 secured thereto by bolts 27, there being set screws 28 threaded in their ends and bearing on the ends of the crossed rods 18 to vary the angle of incline of the cutter blades 26. Each of the members 18 has its upper end curved upwardly and terminating in a shouldered pin 29 to loosely fit within an opening 30 in the upper corner of a sector shaped weight 31, there being one of these weights suspended in this manner on each side of the axle. Each weight 31 has a hook shaped extension 32 passing beneath the axle 16 with the set screw 33 threaded therein to clamp the axle and prevent the weight from swinging. Each weight is provided with one or more series of stops or rack teeth 34 on its curved upper surface which is concentric with the axle, two series of these teeth being shown in the drawings, and a spring pawl 35 carried by the handle 17 is adapted to be engaged therewith. The yoke members of the handle have sleeves 36 between them and rigid therewith, through which passes a tube 37 clamped in place by means of set screws 38. The end of the tube 37 extends between the rows of rack teeth 34 on the weights and the pawl for engaging the teeth consists of a sleeve 39 slidably mounted on the end of the tube with a pair of lugs 40 to fit between the teeth. A bolt 41 passes through the sleeve 39 and through slots of the tube and has a wire 42 connected within the tube and extending through the tube to a hand lever 43 on the cross member 44 of the handle which is clamped to the tube 37 by means of a set screw 45. A coil spring 46 surrounds the tube 37 and bears at one end against one of the sleeves 36 and at the other end against the sleeve 39 so as to press the pawl into engagement with the rack teeth. By this means the handle may be shifted from one position to another on the rack teeth of either weight or from the rack teeth of one weight to the rack teeth of the other weight, as desired, by pressing on the lever 43 and thereby drawing the pawl out of engagement with the rack teeth and swinging the handle to the desired position. When the lever is again released the spring 46 will force the pawl into engagement with the rack teeth and lock the handle in its new position.

Each of the weights 31 has a swinging handle 47 by means of which it may be lifted from the pins 29 after disengaging the set screw 33 and by means of which it may be moved from place to place.

In operation the floor scraper is forced back and forth across the surface of the floor by means of the handle and at the end of each stroke the handle is changed in its position on the rack teeth from the lower end thereof to the upper end or vice versa and the frame is tilted so as to lift the scraper blade which has been in action and lower the other scraper blade. Thus the scraping action is performed on both the outgoing and incoming stroke of the device, saving much time and effort over constructions which are only adapted for scraping in one direction. If it is more convenient for the operator to stand on the other side of the machine, the handle may be swung to the rack teeth on the other weight where the operation may be performed in the same manner. During the pushing stroke the pressure on the handle is sufficient to cause the scraper blade to perform its work, as the entire device may be swung on the edge of the scraper blade as a fulcrum so as to apply the weight thereto, but on the pulling stroke the engagement of the handle with the rack is desirably made low down so that the machine may be lifted upon the other scraping blade and the weight of the machine effect the desired pressure thereon.

The construction of the frame for supporting the scraper blades is such that considerable freedom of movement is allowed the scraper blade, its supporting plate 22 having the ball and socket joints with the ends of the cross arms 18 and the latter having play on the shaft 16 and in the weights 31, so that the scraper blades will be capable of tilting endwise and maintain their even engagement with the floor without gouging at one end when the wheels pass over an irregular surface.

The scraper blades may be reversed in position, as their other edges are sharpened and toothed in order that they may be used for starting the scraping operation on floors which have been varnished and require such a tool to cut through the hard surface of their coating.

By means of the set screws 28 the angle of the scraping blades may be adjusted to suit the requirements in each instance.

For very rough floors planers are attached to the supporting plates 22, such a planer being illustrated in Figs. 9, 10 and 11. This planer consists of a body or frame portion 48 which is of a V-shape and with bevel edges to which are secured cutting blades 49. A bracket 50 is secured to the frame 48 and has a pair of upwardly extending arms which are adapted to be secured by means of bolts 51 to the supporting plate 22, the base having a plug 52 of rubber or other soft material to receive the cutting edge of the scraping blade 26 and prevent its injury by coming into engagement with the metal frame. The frame 48 has a forwardly extending projection 53 at its apex which carries a V-shaped shoe 54 to bear on the floor just ahead of the cutting blades 49, and arms 55 project from the bracket 50 and are connected with the members of the shoe 54 near the rear ends to brace them and hold them in position. The base 48 has a heel member 56 to bear on the floor and coöperate with the shoe in preventing the cutter blades sinking into the floor too deeply. With the planer attachments in place the device is operated as before described, but on account of their construction it is capable of dressing down rough floors which would not be properly operated upon by the scraper blades. The shoe members 54 and the heel post 56 prevent the cutter blades digging too deeply into the floor and assure an even cutting operation.

When it is desired to move the floor scraper of this invention from place to place the weights 31 may be lifted from the device by means of the bail handles 47 after loosening the thumb screws 33 and swinging them so as to cause their disengagement from the shaft 16 and by means of these handles the weights may be carried about separate from the remainder of the machine.

What I claim as my invention is:

1. A floor scraper comprising a frame, wheels on which the frame is tiltably mounted, and scraper blades on opposite ends of the frame adapted to be alternately brought into engagement with the floor as the frame is swung from one position to the other, and stops connected with the frame a single means for moving the device on the wheels and by engaging the stops serving as a lever for causing the frame to swing from either position to the other.

2. A floor scraper, comprising a frame, wheels on which the frame is tiltably mounted, a pair of scraper blades carried by the frame and adapted to be alternately brought into engagement with the floor as the frame is tilted back and forth, stops connected with the frame and a handle connected with the frame by which the device may be moved on the wheels and adapted to engage the stops to constitute a lever by means of which the frame may be tilted for moving either scraping blade into engagement with the floor and for removing the other therefrom when the direction of movement of the floor scraper is reversed.

3. A floor scraper, comprising a frame, wheels on which the frame is tiltably mounted, a pair of scraper blades carried by the frame and adapted to be alternately brought into engagement with the floor as the frame is tilted back and forth, a handle for moving the floor scraper back and forth, and means on the frame to be engaged by the handle to enable the handle to act as a lever for tilting the frame in either direction and reversing the relation of the scraper blades to the floor when the direction of movement of the floor scraper is reversed.

4. A floor scraper, comprising a frame, wheels on which the frame is tiltably mounted, a pair of scraper blades carried by the frame and adapted to be alternately brought into engagement with the floor as the frame is tilted back and forth, a handle for moving the floor scraper back and forth, a rack carried by the frame, and a hand controlled pawl on the handle for engaging the rack to cause the frame to tilt and reverse the relation of the scraper blades with the floor when the direction of movement of the floor scraper is reversed.

5. A floor scraper, comprising a frame, wheels on which the frame is tiltably mounted, a pair of scraper blades carried by the frame and adapted to be alternately brought into engagement with the floor as the frame is tilted back and forth, a weight mounted on the frame, a rack carried by the frame, a handle connected with the frame by means of which the floor scraper may be moved back and forth, and a hand controlled pawl on the handle for engaging the rack to tilt the frame and reverse the relation of the scraper blades with the floor when the direction of movement of the floor scraper is reversed.

6. A floor scraper, comprising a pair of wheels, a shaft on which the wheels are mounted, pairs of crossed arms loosely mounted on the shaft and movable with relation to each other, scraper blades loosely connected between the pairs of crossed arms so as to be capable of having their ends move independently, said crossed arms constituting a frame, a handle connected therewith by means of which the floor scraper may be moved back and forth and having an engagement with the frame for tilting the frame and reversing the relation of the scraper blades with the floor when the direction of movement of the floor scraper is reversed.

7. A floor scraper, comprising a pair of wheels, a shaft on which the wheels are mounted, pairs of crossed arms loosely mounted on the shaft and movable with relation to each other, scraper blades loosely connected between the pairs of crossed arms so as to be capable of assuming inclined positions, weights mounted on the crossed arms, said crossed arms constituting a frame, and a handle having adjustable connection with the frame for tilting it and reversing the relation of the scraper blades with the floor when the direction of movement of the floor scraper is reversed.

8. A floor scraper, comprising a pair of wheels, a shaft on which the wheels are mounted, pairs of crossed arms loosely mounted on the shaft and movable with relation to each other, scraper blades loosely connected between the pairs of crossed arms so as to assume freedom of movement thereof, weights mounted on the crossed arms, a rack on one of the weights, and a handle mounted on the shaft and having a pawl for engaging the rack to reverse the relation of the scraper blades with the floor when the direction of movement of the floor scraper is reversed.

9. A floor scraper, comprising a pair of wheels, a shaft on which the wheels are mounted, pairs of crossed arms loosely mounted on the shaft and movable with relation to each other, stops for limiting the movement of the crossed arms with relation to each other, scraper blades loosely connected between the pairs of crossed arms at the lower ends thereof, pins projecting from the upper ends of the crossed arms, weights on opposite sides of the shaft suspended from the pins of the crossed arms, racks on the weights, and a handle mounted on the shaft having a pawl for engaging either of the racks to reverse the relation of the scraper blades with the floor when the direction of movement of the floor scraper is reversed.

10. A floor scraper, comprising a pair of wheels, a shaft on which the wheels are mounted, arms loosely mounted on the shaft, a plate having end ears with recesses, ball shaped projections on the lower ends of the crossed arms fitting in the recesses and forming ball and socket joints therewith, bolts loosely passing through said joints and permitting free movement of the plate, a scraper blade mounted on the plate, and means connected with the shaft for moving the floor scraper.

11. A floor scraper, comprising a pair of wheels, a shaft on which the wheeels are mounted, arms loosely mounted on the shaft, a plate having end ears with recesses, ball shaped projections on the lower ends of the crossed arms fitting in the recesses and forming ball and socket joints therewith, bolts loosely passing through said joints and permitting free movement of the plate, a scraper blade mounted on the plate, a set screw threaded through the plate and bearing on one of the arms for adjusting the angular position of the scraper blade, and means for moving the floor scraper.

12. A floor scraper, comprising a pair of wheels, a shaft on which the wheels are mounted, pairs of crossed arms loosely mounted on the shaft and having a limited movement with relation to each other, plates having end ears with recesses, ball shaped projections on the lower ends of the crossed arms fitting in the recesses and forming ball and socket joints therewith, bolts loosely passing through said joints and having flexible washers permitting free movement of the plates, scraper blades mounted on the plates, set screws threaded through the blades and bearing on the arms for adjusting the angular position of the scraper blades, and a handle mounted on the shaft by which the floor scraper may be moved.

13. A floor scraper, comprising a pair of wheels, a shaft on which the wheels are mounted, pairs of crossed arms loosely mounted on the shaft and having a limited movement with relation to each other, plates having end ears with recesses, ball shaped projections on the lower ends of the crossed arms fitting in the recesses and forming ball and socket joints therewith, bolts loosely passing through said joints and having flexible washers permitting free movement of the plates, scraper blades mounted on the plates, set screws threaded through the blades and bearing on the arms for adjusting the angular position of the scraper blades, pins formed on the upper end of the crossed arms, weights on opposite sides of the shaft suspended on the pins on that side, racks on the weights, and a handle mounted on the shaft and provided with a pawl for engaging the racks to change the relation of the scraper blades with the floor when the direction of movement of the floor scraper is reversed.

14. A floor scraper, comprising a shaft, a pair of wheels loosely mounted thereon, cross arms having limited movement with relation to each other and loosely mounted on the shaft, plates loosely connected to the lower ends of the cross arms, scraper blades secured to the plates, weights suspended on the cross arms, means for moving the floor scraper from place to place, and a planer adapted to be attached to the plates, comprising a V-shaped frame with beveled edges, cutter blades secured to the beveled edges of the frame, a shoe carried by the frame in advance of the cutter blades, and upwardly extending arms for engagement with the plate.

15. A floor scraper, comprising a shaft, a pair of wheels loosely mounted thereon, cross arms having limited movement with relation to each other and loosely mounted on the shaft, plates loosely connected to the lower ends of the cross arms, scraper blades secured to the plates, weights suspended on the cross arms, means for moving the floor scraper from place to place, and a planer adapted to be attached to the plates, comprising a V-shaped frame with beveled edges, cutter blades secured to the beveled edges of the frame, an integral forwardly extending projection at the apex of the frame, a V-shaped shoe formed therewith and located in advance of the cutting blades, a bracket secured to the frame with outwardly extending arms secured to the shoe and upwardly extending arms to engage the plate, and a heel projection at the rear of the frame to coöperate with the shoe in determining the position of the blades.

16. A floor scraper, comprising a frame, wheels on which the frame is tiltably mounted, a pair of scraper blades carried by the frame and adapted to be alternately brought into engagement with the floor as the frame is tilted back and forth, a handle for moving the device back and forth on the wheels, and means coöperating therewith for tilting the frame and locking the frame with relation to the handle in either tilted position.

17. A floor scraper, comprising a frame, wheels on which the frame is tiltably mounted, scraper blades on opposite ends of the frame adapted to be alternately brought into engagement with the floor as the frame is tilted from one position to the other, and a handle for moving the device on the wheels adapted to be locked to the frame in either tilted position of the frame.

18. A floor scraper, comprising a frame, wheels on which the frame is tiltably mounted, a pair of scraper blades carried by the frame and adapted to be alternately brought into engagement with the floor as the frame is tilted back and forth, a handle for moving the floor scraper back and forth, and means on the frame having teeth to be engaged by the handle for locking the handle to the frame in either tilted position of the frame whereby the handle may serve as a lever for controlling the pressure of each scraper blade against the floor.

19. A floor scraper, comprising a frame, wheels on which the frame is tiltably mounted, a pair of scraper blades carried by the frame and adapted to be alternately brought into engagement with the floor as the frame is tilted back and forth, a handle extending from one end of the device for moving the floor scraper back and forth, and means connecting the handle with the frame to lock them together in either tilted position of the frame.

20. A floor scraper, comprising a frame, wheels on which the frame is tiltably mounted, a pair of scraper blades carried by the frame and adapted to be alternately brought into engagement with the floor as the frame is tilted back and forth, a handle extending from one end of the machine for moving the floor scraper back and forth, and means on the frame to be engaged by said handle for tilting the frame and for permitting the handle to serve as a lever for controlling the pressure of each blade upon the floor.

21. In a floor scraper, the combination of a supporting roller, a blade-holder swingingly connected therewith, a handle swinging independently of said roller, about the axis on which said blade-holder swings, said blade-holder and handle extending in opposite directions from the roller, and means for transmitting pressure from the handle to the blade-holder to depress the latter when the handle is lifted, said means constituting a connection between the blade-holder and handle independent of the pivotal connection of the handle with the roller.

In testimony whereof, I affix my signature, in presence of two witnesses.

JOHN F. WEBER.

Witnesses:
  R. S. C. CALDWELL,
  ANNA F. SCHMIDTBAUER.